Jan. 2, 1923. 1,440,440
H. C. BIERMAN.
COMPOSITE ARTICLE AND METHOD OF FORMING THE SAME.
FILED DEC. 14, 1920.
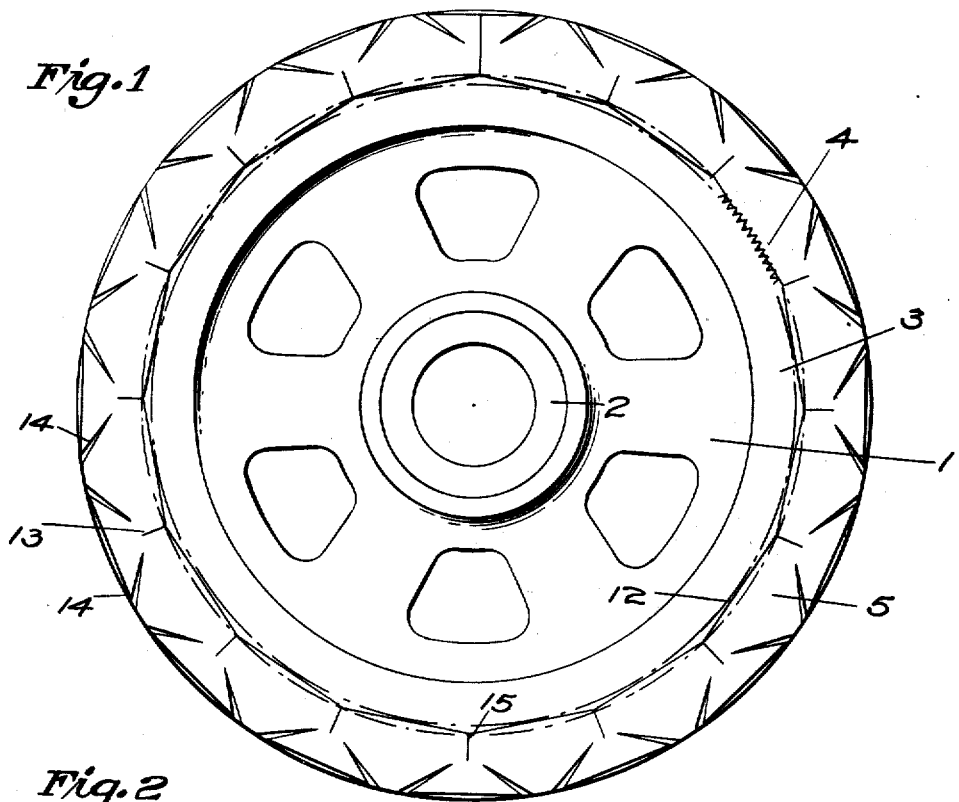
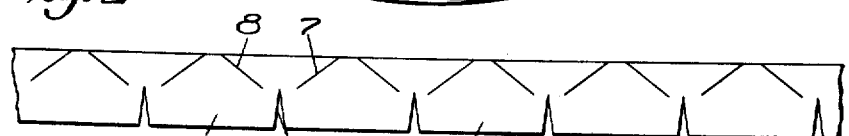
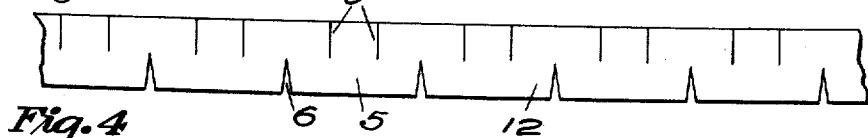
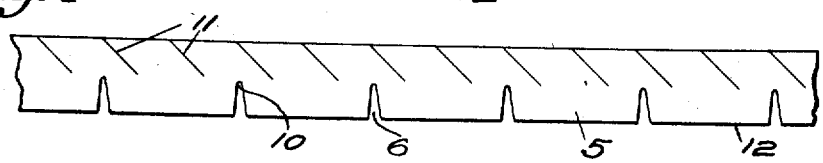
WITNESSES:
INVENTOR
Harry C. Bierman.
BY
ATTORNEY.

Patented Jan. 2, 1923.

1,440,440

UNITED STATES PATENT OFFICE.

HARRY C. BIERMAN, OF EDGEWOOD PARK, PENNSYLVANIA, ASSIGNOR TO WESTINGHOUSE ELECTRIC & MANUFACTURING COMPANY, A CORPORATION OF PENNSYLVANIA.

COMPOSITE ARTICLE AND METHOD OF FORMING THE SAME.

Application filed December 14, 1920. Serial No. 430,727.

*To all whom it may concern:*

Be it known that I, HARRY C. BIERMAN, a citizen of the United States, and a resident of Edgewood Park, in the county of Allegheny and State of Pennsylvania, have invented a new and useful Improvement in Composite Articles and Methods of Forming the Same, of which the following is a specification.

This invention relates to composite articles, more especially to articles formed of sheet material impregnated with, and held together by, a hardened binder and adapted for use as machine elements, such as gears, pinions, pulleys and the like.

Heretofore, in forming articles of this type, a metal center was provided, the surface of said center being knurled, and composite material was molded on said surface. Generally, the composite material consisted of rings, sectors, or segments of paper or fabric impregnated with a suitable binder, such as a phenolic condensation product. The segments were stacked about the metal hub by hand after which the assembly was placed in a mold and consolidated by heat and pressure to form a unitary mass.

Such procedure produced satisfactory articles but the process was expensive. In cutting rings, sectors, or segments to be assembled about the metal center, it was necessary to form the same from a sheet of paper or fabric by cutting or punching properly shaped pieces. This resulted in a large amount of waste, as high as 55% to 60% in the case of rings and 35% to 40% where sectors were utilized. Since the material used is very expensive, such waste resulted in increased cost of manufacture.

Furthermore, a large amount of labor was required in assembling such rings or sectors, since they were necessarily assembled by hand. As will be readily understood, considerably more labor was required to assemble a relatively large number of sectors than rings, and the labor cost in such case was very high.

My invention is designed to obviate such disadvantages, it being among the objects thereof to provide a composite structure and a method of forming the same which shall be simple, which greatly reduces or almost entirely avoids waste of material, and which requires very little hand labor.

In practising my invention, I provide a metal center, as heretofore, but, instead of forming rings, sectors, or segments of fibrous material impregnated with a suitable binder, I provide a single strip or, if desired, a plurality of strips of the proper width and impregnated with the binder. The strip is provided with narrow, deep notches and slits so as to allow winding the same helically without wrinkling of the surface thereof. The layer of material so cut is then wound helically on edge about the face of the metal center, the assembly being then subjected to heat and pressure in a mold to consolidate the material and harden the binder.

In the accompanying drawings forming a part hereof and illustrating several embodiments of my invention, Fig. 1 is a plan view of a gear blank formed in accordance with my invention, some of the details of the structure being exaggerated to more clearly illustrate the same;

Fig. 2 is a plan view of a strip of material cut in accordance with my invention, and Figs. 3 and 4 are similar views showing slightly different forms of cut strips.

A metal center 1 of any suitable form having a hub 2 and rim 3 is provided. The surface 4 of the rim is formed with straight or cross knurls.

A strip 5 of fibrous material, such as paper, cloth, asbestos, or other suitable material, such as sheet cork, impregnated with a suitable binder, such as a fusible, soluble phenolic condensation product, is provided. Wedge-shaped notches 6 are formed in one of the edges of the strip 5 at regularly spaced intervals, the narrow portions of said wedge-shaped notches extending to approximately the central line of the strip 5. Pairs of slits 7 and 8 are cut in the opposite edge of the strip, the slits of each pair being oppositely disposed, preferably at angles of about 45° to the edge of the strip and terminating near the inner ends of the adjacent notch 6.

In Fig. 3 I have shown a slightly modified form of the strip in which the notches 6 are provided as before but in which parallel slits 9 replace the diagonal slits 7 and 8 of Fig. 2.

In the embodiment of the invention shown in Fig. 4, the notches and slits are modified slightly to allow of the same being cut in a very simple manner by a properly formed reciprocating die or rotary cutter. The notches 6, instead of having sharp points, are formed with slight enlargements 10 at their inner ends to allow the die or cutter to readily cut out the portion of material from the strip. Slits 11 formed in the opposite edge of the strip are all inclined in the same direction and preferably parallel. With such a cut strip, a die or cutter may be readily used for forming both slits and notches simultaneously, with practically no danger of wrinkling or distorting the material.

Material cut as shown, or in any other suitable manner, is wound on a suitable spool and fed to a rotating spindle, (not shown) which carries the metal center 1. The strip is wound about the surface 4 of center 1 by the rotation thereof, with the edge 12 of the strip bearing against the knurling on said surface. A suitable number of layers are wound about the metal center in planes at right angles to the axis of the center, the number being determined by an automatic counter attached to the device. The assembly is then placed in a mold where it is treated by heat and pressure to consolidate the material and harden the binder, forming a unitary structure.

In winding the material about the center, the notches 6 are closed, forming slits 13 and slits 7 and 8, 9 or 11, as the case may be, are opened slightly to form notches 14. The straight sides of the inner edge 12 of the strip provide narrow spaces 15 between the material and the knurled surface 4.

In applying heat and pressure to the material in the mold, the fibres of the material are caused to flow, filling in openings 14 and 15 and rendering the entire mass uniform. There is no tendency of the wound material to roll or wrinkle.

My new method of forming composite articles has a number of advantages over prior structures in that the loss of material by cutting is only 3% to 5%, at the most, whereas, by former methods, the waste was at least 35% to 40%. My method also avoids the necessity of hand labor for assembling the material, thereby reducing the cost of manufacture considerably.

It is obvious that, although I have described, in detail, several embodiments of my invention, such details do not limit the scope of my invention but are merely illustrative thereof. For instance, although I have described notches and slits in the material, it is obvious that, in some cases, I may dispense with the slits or, instead of forming notches, I may form slits on either one or both edges of the strip of material.

The assembling of the strip directly upon the metal center may be omitted, and, in some cases, where a metal center is not to be used, the material may be assembled upon a mandrel and then consolidated by heat and pressure to form a ring of composite material. I may also form my material on a mandrel and then transfer the assembly to the metal hub.

I may wind a plurality of strips of material of different kinds simultaneously to form a composite article having certain desirable properties. For instance, I may utilize strips of fabric and cork to give a resilient, friction surface or I may wind strips of woven fabric and paper to obtain a material having excellent wearing qualities.

I claim as my invention:

1. A composite article comprising helically-wound sheet material having cuts therein.

2. A composite article comprising helically-wound sheet material having notches therein.

3. A composite article comprising helically-wound sheet material having notches and slits therein.

4. A composite article comprising helically-wound sheet material having notches and diagonal slits therein.

5. A composite article comprising a metal center and helically-wound sheet material having cuts therein on said center.

6. A composite article comprising a metal center and helically-wound sheet material thereon, the layers so formed being at right angles to the axis of said center.

7. A composite article comprising a helically-wound sheet material having cuts therein held together by a hardened binder.

8. A composite article comprising helically-wound sheet material having notches therein held together by a hardened binder.

9. A composite article comprising helically-wound sheet material having notches and diagonal slits therein and held together by a hardened binder.

10. A method of forming composite articles which comprises cutting sheet material to provide notches and slits, winding said material helically to form superposed layers and uniting said layers to form a unitary mass.

11. A method of forming composite articles which comprises providing a metal center, cutting sheet material to provide notches and slits, winding said material helically to form superposed layers at right angles to the axis of said center, and uniting said layers to form a unitary mass.

12. A method of forming composite articles which comprises providing a metal center cutting a strip of sheet material along one edge to form notches and along the other edge to form slits, winding said material with the edge having the notches adjacent to the face of said center to form superposed layers, and uniting said layers to form a unitary mass.

In testimony whereof, I have hereunto subscribed my name this 3rd day of December, 1920.

HARRY C. BIERMAN.